United States Patent [19]
Kubo

[11] 3,738,443
[45] June 12, 1973

[54] CONTROL SYSTEM FOR THE TRAVEL OF A GOODS TROLLEY

[76] Inventor: Moritada Kubo, 35-19-Ohyama-cho, Shibuya-ku, Tokyo, Japan

[22] Filed: Nov. 25, 1970

[21] Appl. No.: 92,800

[30] Foreign Application Priority Data
Nov. 28, 1969 Japan............................ 44/95028
Nov. 28, 1969 Japan............................ 44/112472

[52] U.S. Cl. .................. 180/98, 73/490, 180/79.1, 318/587
[51] Int. Cl. ............................................. B60k 27/06
[58] Field of Search ........................... 180/98, 79.1; 318/580, 587, 577, 603; 73/490

[56] References Cited
UNITED STATES PATENTS

| | | | |
|---|---|---|---|
| 3,198,279 | 8/1965 | Quinn | 180/98 X |
| 3,443,666 | 5/1969 | Abe et al. | 318/603 X |
| 3,495,677 | 2/1970 | Wilson | 180/98 |
| 3,465,217 | 9/1969 | Kress | 318/601 |
| 3,085,646 | 4/1963 | Paufue | 180/98 |
| 2,070,432 | 2/1937 | Huebscher | 180/98 |
| 2,493,755 | 1/1950 | Ferrill, Jr. | 180/98 |

*Primary Examiner*—Leo Friaglia
*Assistant Examiner*—John P. Silverstrim
*Attorney*—Flynn & Frishauf

[57] ABSTRACT

A control system for controlling the travel of a goods trolley comprising a first detector for control of the travelling distance of the trolley and second and third paired detectors for control of the course of the trolley, all said detectors being mounted on the trolley and a detected member located along the trolley course for generating both analog and digital control indicia so as to cause the first detector to give a digital quantity and the second and third detectors to give an analog quantity, wherein the output from the first detector is calculated by a counter, the output from said counter is compared with a reference value for control of the distance to be covered by the trolley, and outputs from the second and third detectors are conducted to a differential amplifier, the trolley course being controlled until output from the differential amplifier attains a prescribed value.

10 Claims, 8 Drawing Figures

3,738,443

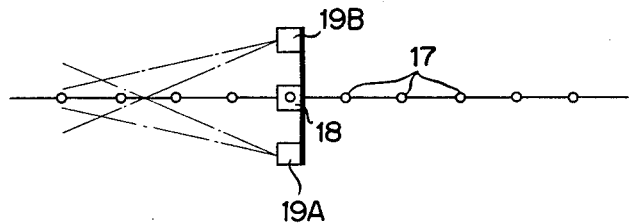
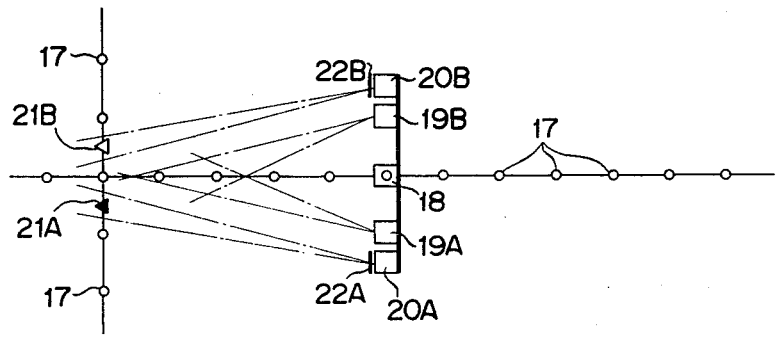
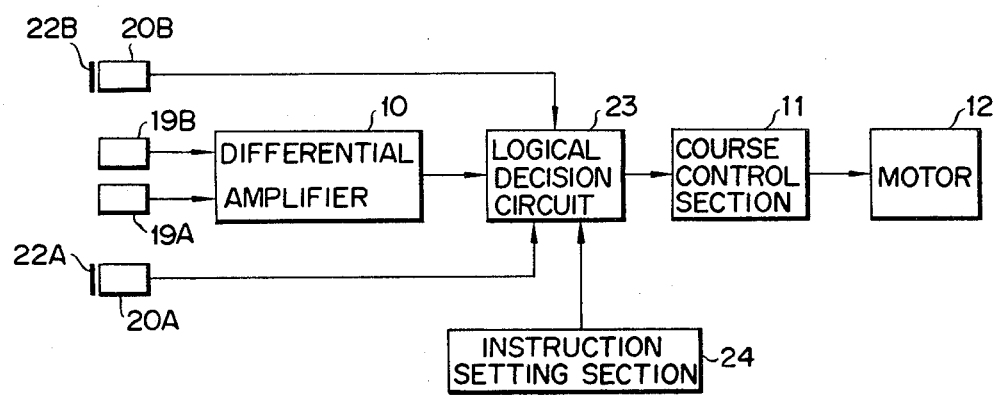

CONTROL SYSTEM FOR THE TRAVEL OF A GOODS TROLLEY

BACKGROUND OF THE INVENTION

The present invention relates to a trolley travel controlling system for unmanned operation, or operation without attendant, of a trolley carrying goods from a given area to a desired point in a premises including buildings, for example, a railroad station, mill, plant or warehouse.

The prior art control system for conducting a trolley to a destination by unmanned operation consists in laying a conductor on or under the ground surface or building floor along a trolley course, introducing through the conductor electric current, for example, of low frequency, providing a trolley with a pair of detectors for detecting the magnetic flux generated by alternating current flowing through the conductor in horizontally symmetrical relationship with respect to the control line of the trolley or its travelling course, controlling the drive section of the trolley by outputs from the paired detectors until the outputs become equal, thereby leading the trolley along its proper course.

However, the aforementioned process is only applicable in controlling the trolley course, and control of the travelling distance and stop position of the trolley is effected by separate means. Accordingly, the conventional system has the drawbacks that there has to be used a complicated process in controlling the travelling course and distance of a trolley as well as its stop position.

SUMMARY OF THE INVENTION

It is accordingly an object of the present invention to provide a trolley travel controlling system capable of controlling by simple arrangement the travelling course and distance of the trolley as well as its stop position.

According to the present invention, there is provided a control system for the travel of a goods trolley comprising a trolley; a detected member laid along the trolley course; a first detector mounted on the trolley for detecting a digital quantity associated with the detected member; second and third paired detectors carried on the trolley for detecting an analog quantity associated with the detected member; a counter for calculating output from the first detector; means for controlling the travelling distance of the trolley by comparing output from the counter with a reference value; a differential amplifier supplied with output from the second and third detectors; and means for controlling the trolley course until output from the differential amplifier attains a prescribed value.

BRIEF EXPLANATION OF THE DRAWINGS

FIG. 5 is a schematic top view of FIG. 4;

FIG. 6 is a schematic top view like FIG. 5 of still another embodiment of the invention; and FIG. 7 is a schematic block diagram of the trolley course controlling section of FIG. 6.

DESCRIPTION OF THE PREFERRED EMBODIMENTS

Figure 1:
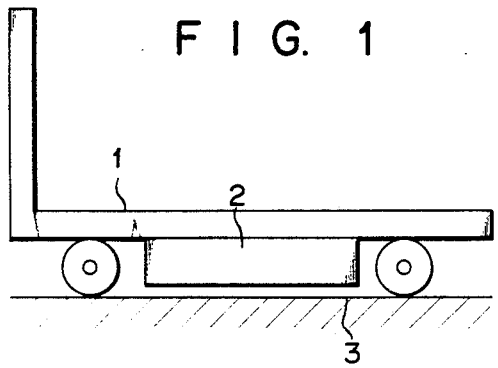
FIG. 1 is a schematic side view of an unmanned trolley.

Referring to FIG. 1, the reference numeral 1 represents a goods trolley under which there is provided a drive section 2 for unmanned operation. The drive section 2 comprises a motor for driving the trolley, another motor for controlling its course, a battery for operating these motors, a mechanism for transmitting the motor rotation to the trolley wheels and a control section for unmanned operation.

Figure 2A:
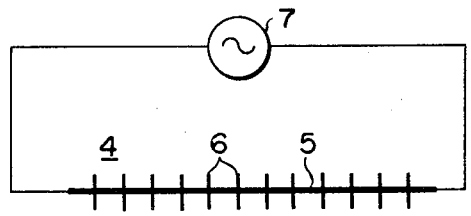
FIG. 2A is a schematic plan view of a detected member to be laid along a trolley course.
Figure 2B:
FIG. 2B is a modification of the detected member of FIG. 2A.

According to an embodiment of the present invention, there is laid a detected member 4 assuming a form shown in FIGS. 2A and 2B on or under the ground surface or floor, over which the trolley 1 travels. The member 4 to be detected shown in FIG. 2A has a conductor 5 extending along the trolley course and a plurality of projections 6 disposed crosswise of the conductor 5 at an equal spacing. FIG. 2A indicates a detected member 4 wherein the projections 6 extend outward from both longitudinal sides of the conductor 5. However, as illustrated in FIG. 2B, the projections 6 may be so formed as to extend outward only from one longitudinal side of the conductor 5.

Both ends of the conductor 5 are connected to an A.C. source 7 having a frequency of, for example, 10Hz to 10KHz.

The conductor and low frequency current flowing therethrough give the later described analog quantity for controlling the course of the trolley, while the projections 6 formed on the conductor 5 provide a digital quantity for controlling its travelling distance.

The detected member 4 is prepared from press punched iron plates, aluminum foil or other metal materials. In the case of aluminum foil, it is preferred for protection that the foil be sandwiched between two adhesive tapes.

There will now be described by reference to FIG. 3 the operation of a trolley travel controlling system according to the present invention. In the drive section 2 of the trolley 1 are installed a pair of detectors 8A and 8B in horizontally symmetrical relationship with respect to the conductor 5. These detectors 8A and 8B may consist of induction coils in which there is induced a voltage by a magnetic flux generated by electric current flowing through the conductor 5. In the drive section 2 there is further provided another detector 9 in a manner to face the projections 6 of the detected member 4. Where the projections 6 are magnetized, the detector 9 may be an induction coil like the detectors 8A and 8B. Otherwise, the detector 9 may be a coil through which there flows electric current. If, in this case, the detector 9 is drawn near the projections 6, the coil inductance varies, thereby detecting the projections as a digital quantity. The detector 9 may also be a coil impressed with high frequency current. In this case, the projections 6 can be detected by loss of energy due to the occurrence of an eddy current in the projections 6. Further, there may be used other means for detecting the projections 6.

Outputs from the paired detectors 8A and 8B (an analog quantity, that is, a function of the distance between the conductor and detectors) are conducted to a differential amplifier 10. If the trolley 1 deflects from the detected member 4, then either of the paired detectors 8A and 8B will approach the detected member with the result that the polarity and magnitude of output from the differential amplifier 10 will change with the direction in which the trolley course is displaced as well as the magnitude of the displacement.

Introduction of the output from the differential amplifier 10 into the trolley course controlling section 11 controls a motor 12 for controlling the course with respect to its rotating direction and angle. The motor 12 is controlled until the output from the differential amplifier 10 attains a prescribed value, for example, zero; that is, until the trolley takes a proper position with respect to the detected member 4.

Output pulses from the detector 9 are conducted to a counter 13 to calculate the number of the projections 6 of the detected member 4 which were detected. The output from the counter 13 is brought into a control section 14 for the travelling distance of the trolley 1. There is set in advance a reference value indicating the distance through which the trolley 1 should travel. When there is agreement between output from the counter 13 and the reference value, the trolley distance controlling section 14 generates a signal to control a drive motor 16 in order to stop the trolley 1. This signal disconnects the motor 16 from the battery and causes a braking force to be applied thereto.

There will now be described by reference to FIGS. 4 and 5 an optical control system according to another embodiment of the present invention. According to this embodiment, there are spatially arranged a plurality of light sources, for example, incandescent or fluorescent lamps as detected members on the ceiling along the travelling course of the trolley 1 at an equal spacing. In this case, the trolley 1 is provided with a detector 18 including a photo-electric conversion element such as a phototransistor for detecting the plural light sources one by one as a digital quantity and a pair of detectors 19A and 19B for detecting the light quantity of the light sources as an analog quantity.

Figure 4:
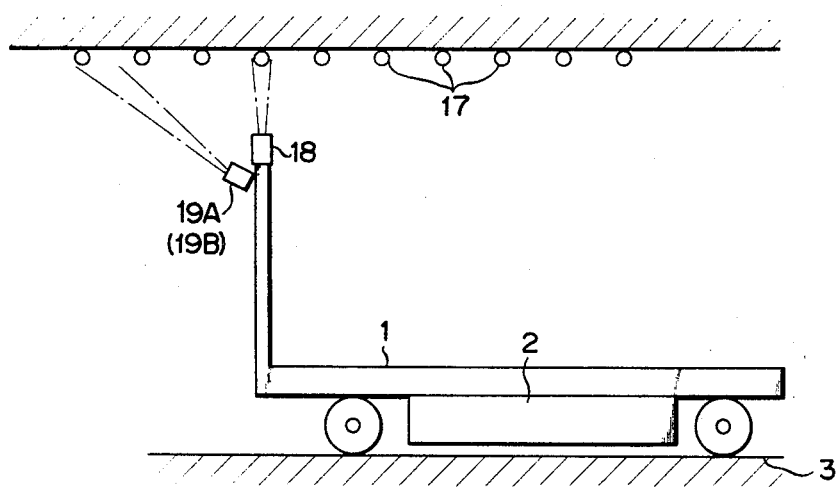
FIG. 4 is a schematic side view of a trolley using an optical control system according to another embodiment of the present invention.

The region defined between two chained lines above the detectors 18 and 19A or 19B illustrated in FIG. 4 represents the detecting field thereof. The detecting field may be adjusted in any desired manner by incorporating a photoelectrical conversion element in a proper casing.

The paired detectors 19A and 19B are positioned, as shown in FIG. 5, in horizontally symmetrical relationship with respect to the other detector 18. Accordingly, the detecting fields of the paired detectors 19A and 19B assume a similar symmetrical relationship. The detecting field defined by the paired detectors 19A and 19B is so designed as to include some of the light sources placed above the trolley course.

Figure 3:
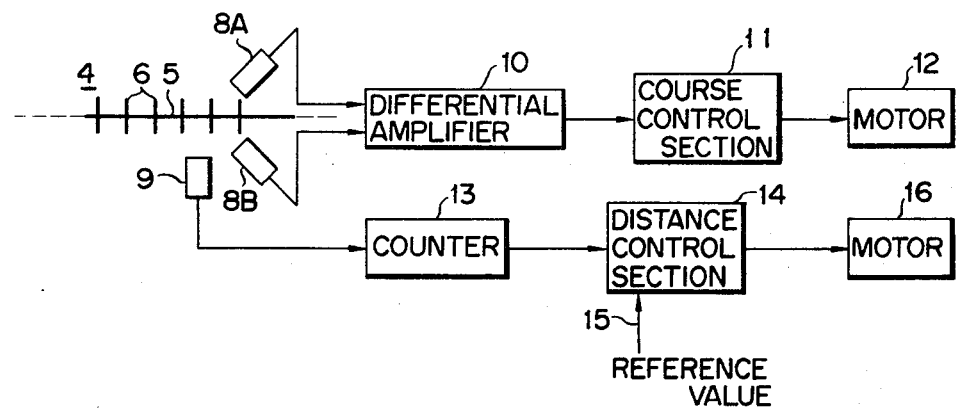
FIG. 3 is a schematic block diagram of an embodiment of the present invention including the sections for controlling the travelling distance and course of the trOlley.

The embodiment of FIGS. 4 and 5 carries out control in the same manner as that of FIG. 3. Namely, output pulses from the detector 18 are conducted to a counter, and outputs from the paired detectors 19A and 19B are introduced into the differential amplifier 10.

There will now be described by reference to FIGS. 6 and 7 a modification of the optical control system of FIGS. 4 and 5. In this modification there is provided another pair of detectors 20A and 20B in addition to the paired detectors 19A and 19B of FIGS. 4 and 5 in horizontally symmetrical relationship with respect to the detector 18. At each corner of the trolley course there is disposed a pair of different colored light sources 21A and 21B so as to fall within the detecting fields of the aforesaid paired detectors 20A and 20B respectively.

Outputs from the paired detectors 19A and 19B are conducted to the differential amplifier 10 as in the preceding embodiment of FIGS. 4 and 5. In front of the additional paired detectors 20A and 20B are positioned optical filters 22A and 22B, which are so designed as to selectively allow light source beams present in the detecting field of each detector to pass therethrough. Outputs from the differential amplifier 10 and the additional paired detectors 20A and 20B are supplied to a logical decision circuit 23. The output from the logical decision circuit 23 is conducted to the trolley course controlling section 11. To control the circuit 23, there is further provided an instruction setting section 24.

Where the trolley linearly travels or is approaching a corner of its course, the logical decision circuit 23 is so arranged as to allow the differential amplifier output resulting from outputs from the paired detectors 19A and 19B to be directly introduced into the trolley course controlling section 11. When the trolley is brought to the corner, the paired detectors 20A and 20B detect beams from the different colored light sources 21A and 21B, and outputs from the detectors 20A and 20B are supplied to the logical decision circuit 23. If, in case output from the detector 20B exists, an instruction, for example, of a righthand turn is set in the instruction setting section 24, then the trolley course controlling motor 12 is controlled by the trolley course controlling section 11 according to output from the detector 20B to cause the trolley to turn to the right.

Where there is given instruction for a linear movement by the instruction setting section 24, the logical decision circuit 23 transmits the output from the differential amplifier 10 to the trolley course controlling section 11, independently of output from the detectors 20A and 20B. At another corner of the trolley course, the trolley may also be made to turn to the left depending on output from the detector 20A as well as the content of instruction designated by the instruction setting section 24. Namely, it is possible to design the instruction setting section 24 so as to allow instructions to vary with the distance through which a trolley is expected to travel, that is, the time required for the travel.

What is claimed is:

1. A control system for controlling the travel of a movable trolley along a course comprising:
   a trolley;
   at least one detected member located at a control location along the trolley course, each of said at least one detected member providing analog control information and each detected member including spaced elements providing digital control information;
   a first detector mounted on said trolley for detecting the digital information provided by said detected member;
   second and third paired detectors carried on said trolley for detecting the analog information provided by said detected member;
   a counter coupled to the output of said first detector for calculating a control signal corresponding to said digital information provided by said detected member;

means for controlling the travelling distance of said trolley by comparing the output from said counter with a given reference value;

a differential amplifier coupled to the outputs of said second and third detectors; and means responsive to the output of said differential amplifier for controlling the direction of the trolley course until the output from said differential amplifier attains a prescribed value.

2. The control system according to claim 1 wherein said detected member is positioned along said course between said second and third detectors.

3. The control system according to claim 1 wherein said detected member comprises a conductor and said spaced elements comprise, a plurality of projections arranged crosswise of said conductor at an equal spacing and a power source for introducing low frequency current through said conductor.

4. The control system according to claim 3 wherein said projections formed crosswise of said conductor extend outward from both longitudinal sides thereof.

5. The control system according to claim 3 wherein said projections formed crosswise of said conductor extend outward only from one longitudinal side thereof.

6. The control system according to claim 3 wherein said conductor extends in a direction parallel with the direction of said trolley course.

7. The control system according to claim 1 wherein said spaced elements comprises a plurality of light sources placed at an equal spacing adjacent the trolley course.

8. The control system according to claim 7 further comprising a pair of differential colored light sources positioned at each corner of the trolley course, an additional pair of detectors for detecting beams from said different colored light sources, and means for controlling the trolley course according to the outputs from each of said additional paired detectors and previously set instructions.

9. The control system according to claim 6 wherein said light sources are located above said trolley course.

10. The control system according to claim 6 wherein said light sources are arranged in a straight line in parallel with said trolley course.

* * * * *